United States Patent
Mathis et al.

(10) Patent No.: US 8,167,518 B2
(45) Date of Patent: May 1, 2012

(54) METHOD AND APPARATUS FOR A SPINDLE WITH SERVO FEED CONTROL

(75) Inventors: Dennis Mathis, Saint Peters, MO (US); Mike Matlack, Saint Charles, MO (US); Scott Anthony Martin, Swansea, IL (US); David L. Fritsche, Foristell, MO (US)

(73) Assignee: The Boeing Company, Chicago, IL (US)

( * ) Notice: Subject to any disclaimer, the term of this patent is extended or adjusted under 35 U.S.C. 154(b) by 1055 days.

(21) Appl. No.: 12/101,619

(22) Filed: Apr. 11, 2008

(65) Prior Publication Data

US 2009/0257836 A1  Oct. 15, 2009

(51) Int. Cl.
 *B23B 47/18* (2006.01)
 *B23B 35/00* (2006.01)

(52) U.S. Cl. .......... 408/1 R; 408/138; 408/141; 408/702

(58) Field of Classification Search .................. 408/129, 408/137, 138, 141, 17, 101, 102, 702, 1 R
See application file for complete search history.

(56) References Cited

U.S. PATENT DOCUMENTS

| | | | | |
|---|---|---|---|---|
| 2,552,041 | A * | 5/1951 | Hallenbeck | 318/571 |
| 2,738,692 | A * | 3/1956 | Jones | 408/11 |
| 2,869,403 | A * | 1/1959 | Bent | 408/130 |
| 3,640,147 | A * | 2/1972 | Fantoni | 74/89.36 |
| 3,859,001 | A * | 1/1975 | Hoddinott et al. | 408/3 |
| 4,358,228 | A * | 11/1982 | Stark | 408/35 |
| 4,473,329 | A * | 9/1984 | Aoshima et al. | 408/11 |
| 4,958,967 | A * | 9/1990 | Adachi | 409/185 |
| 5,184,053 | A * | 2/1993 | Maruo et al. | 318/571 |
| 5,195,859 | A * | 3/1993 | Thornton, Jr. | 411/510 |
| 5,350,263 | A * | 9/1994 | Fedeli | 409/231 |
| 5,538,369 | A * | 7/1996 | Okuda | 408/3 |
| 5,613,810 | A * | 3/1997 | Bureller | 408/3 |
| 5,654,894 | A * | 8/1997 | Tsutsui | 700/188 |
| 5,755,537 | A * | 5/1998 | Lubbering | 408/3 |
| 7,096,555 | B2 * | 8/2006 | Tourne et al. | 29/402.06 |
| 7,722,298 | B2 * | 5/2010 | Russell | 408/1 R |
| 2006/0269369 | A1 | 11/2006 | Fritsche et al. | |

OTHER PUBLICATIONS

"Ball Spline", retrieved Mar. 6, 2008, pp. 1-2 http://www.thk.com/archive_file/technical_dl/pdf_en/B006-007.pdf.
"Cooper Power Tools", pp. 1-222, retrieved Apr. 11, 2008 www.cooperpowertools.com/catalog/pdffiles/SP-1300_EN.pdf.
U.S. Appl. No. 11/610,388, filed Dec. 13, 2006, Fritsche et al.
U.S. Appl. No. 11/690,793, filed Mar. 23, 2007, Mathis.

* cited by examiner

*Primary Examiner* — Daniel Howell
*Assistant Examiner* — Paul M Janeski
(74) *Attorney, Agent, or Firm* — Yee & Associates, P.C.

(57) ABSTRACT

A method and apparatus for a power feed drill. The power feed drill comprises a servo motor, a roller screw, a ball spline shaft, an air motor, and a collet chuck. The roller screw is rotatably mounted to the servo motor. The ball spline shaft has a first end connected to the roller screw, wherein rotation of the roller screw in a first direction moves the ball spline shaft in the first direction and wherein rotation of the roller screw in a second direction moves the ball spline shaft in an opposite direction to the first direction along an axis. The air motor is capable of transmitting rotation motion to the ball spline shaft to rotate around the axis. The collet chuck is fixably attached to a second end of the ball spline shaft, wherein the collet chuck is adapted to receive a tool.

17 Claims, 8 Drawing Sheets

METHOD AND APPARATUS FOR A SPINDLE WITH SERVO FEED CONTROL

BACKGROUND INFORMATION

1. Field

The present disclosure relates generally to manufacturing and in particular to a method and apparatus for drilling holes in objects. Still more particularly, the present disclosure relates to a method and apparatus for drilling and countersinking with a component that may be moved forward and backwards in an axial direction.

2. Background

Manufacturing involves the use of tools and/or labor to create items for use or sale. In aerospace manufacturing, these items may include, for example, aircraft, aircraft parts, missiles, rockets, and/or spacecraft. In manufacturing various items, a number of different operations may be performed. For example, these operations may include, for example, extrusion, pressing, rolling, piercing, machining, drilling, routing, and curing.

With respect to drilling, a drill is used to create holes or channels that are typically cylindrical in solid materials. A drill is a tool with a rotating section that may hold a drill bit to drill holes. A drill bit is a cutting tool used to create holes in an object. These holes may be cylindrical or non-cylindrical depending on the particular implementation. Drilling may involve drilling a channel, such as a cylindrical hole.

In other examples, a specific type of drilling called countersinking may be employed to create a countersink. A countersink is a conical hole in an object. Another type of drilling involves creating a counterbore, which creates a flat-bottomed hole that may be used for a hex-headed capscrew. A countersink may be used for a countersink bolt or screw. In this manner, the head of the bolt or screw is flush or below the surface of the surrounding material.

One type of drill that may be used for drilling holes is a drill with a positive feed feature. This positive feed feature allows the drill to push the drill bit into the object while drilling occurs. Drills also may be used in which the feed feature may be used to push the drill bit into the object and then retract the drill bit while drilling occurs. This type of forward and reverse motion of the drill bit may provide for a cleaner quality hole. Further, this type of drilling also may reduce the amount of heat applied to the object, which also may increase the quality of the hole.

Currently available drills are pneumatic drills. Compressed air and an air valve are used to move the drill forward and to retract the drill. This type of drilling is also referred to as a "peck feed" or "peck and feed" process. With the forward and reverse movement of the drill bit, air valves are used to shift back and forth in the direction of the airflow to move the drill bit forward and backward within the hole.

Currently, these drills are difficult to configure for changes between feed forward drilling, peck and feed drilling, and with countersink drilling processes. Current drill systems may be reconfigured by changing out the drill motors or using a different drill. One current drill system may be configured to drill and countersink. An example is a 932QR, which is available from Cooper Power Tools, which is a division of Cooper Industries, LSE.

Although this type of tool provides different feed rates to move a drill back and forth, these drill rates have fixed increments for revolution. Changes to the feed rate and the spindle speed are adjusted by performing mechanical changes to the configuration of the tool. This tool is controlled by air logic valves to perform the forward and backward movement of the drill bit.

Therefore, it would be advantageous to have an improved method and apparatus to overcome the problems described above.

SUMMARY

The advantageous embodiments provide a method and apparatus for a power feed drill. The power feed drill comprises a servo motor, a roller screw, a ball spline shaft, an air motor, and a collet chuck. The roller screw is rotatably mounted to the servo motor. The ball spline shaft has a first end connected to the roller screw, wherein rotation of the roller screw in a first direction moves the ball spline shaft in the first direction and wherein rotation of the roller screw in a second direction moves the ball spline shaft in an opposite direction to the first direction along an axis. The air motor is capable of transmitting rotation motion to the ball spline shaft to rotate around the axis. The collet chuck is fixably attached to a second end of the ball spline shaft, wherein the collet chuck is adapted to receive a tool.

In another advantageous embodiment, an apparatus comprises a biasing unit capable of being moved by a first motor. A rotatable shaft system has a shaft that is capable of being rotated about an axis and the shaft has a first end connected to the biasing unit, wherein the biasing unit is capable of moving the rotatable shaft system a first direction and a second direction along the axis while the shaft rotates about the axis. The collet chuck fixably attached to a second end of the shaft, wherein the collet chuck is adapted to receive a tool.

In yet another advantageous embodiment, a method for performing a drilling operation is provided. A spindle assembly is positioned to perform the drilling operation on an object, wherein the spindle assembly comprises a roller screw rotatably mounted to a servo motor; a ball spline shaft having a first end connected to the roller screw, wherein rotation of the roller screw in a first direction moves the ball spline shaft in the first direction and wherein rotation of the roller screw in a second direction moves the ball spline shaft in an opposite direction to the first direction along an axis, wherein the ball spline shaft is rotatable around the axis while moving in the first direction and in the second direction; and a collet chuck fixably attached to a second end of the ball spline shaft, wherein the collet chuck is adapted to receive a tool. The drilling operation is performed using the spindle assembly.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
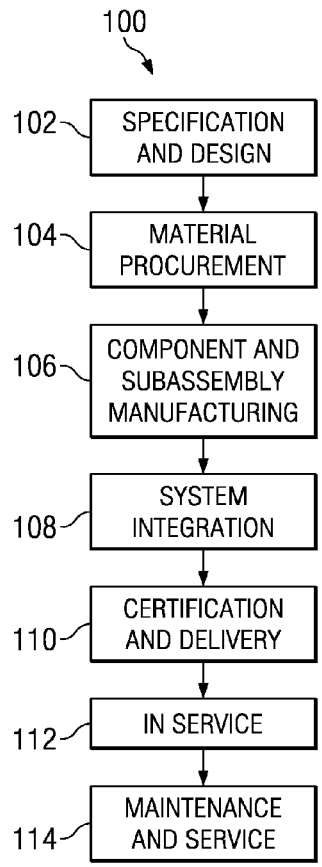
FIG. 1 is a diagram illustrating an aircraft manufacturing and service method in accordance with an advantageous embodiment.
Figure 2:
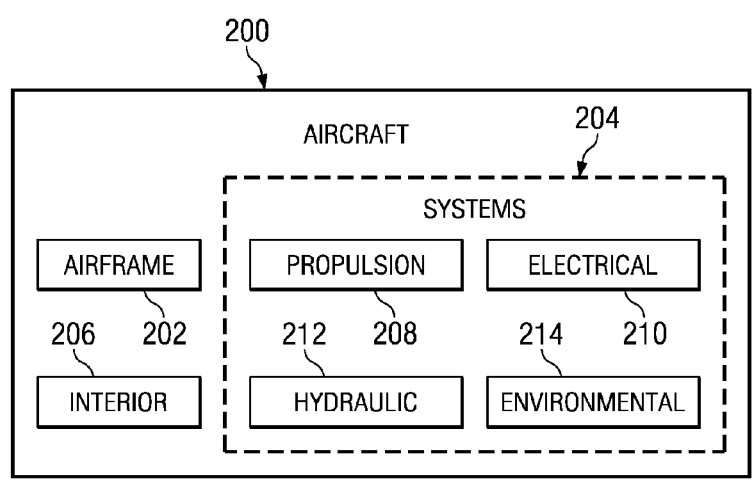
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that currently used air valves for moving a drill spindle forward and backward axially do not always provide the desired feed rates. The different advantageous embodiments recognize that the feed rates are only available in fixed increments. For example, the movement of a spindle axially may be in increments such as 0.001 inches, 0.003 inches, or 0.006 inches per revolution. Additionally, fixed spindle speeds also may be present, such as 750 revolutions per minute and 1100 revolutions per minute.

The different advantageous embodiments also recognize that one problem with these types of drills is that changing the increments for movement of the spindle axially and the spindle rotation speeds require maintenance to mechanically change the feed rate and spindle speed. These kinds of changes currently cannot be made or programmed into a drill. Also, for peck and feed operations, the air valves used in currently available drills to shift back and forth the control the air flow are affected by air pressure, lubrication, and dirt in the air supply.

Further, the different advantageous embodiments recognize that the precision provided by currently available drills may not meet those needed for different drilling operations to increase the quality of the holes. These currently available drills only have the capability to fully retract to the starting position at each peck which progressively increases with each peck up to a total of 4.0 inches of travel.

The different advantageous embodiment may be controlled to retract any given distance or combination of full retract pecks and partial pecks, at programmable variable combinations of speeds for rapid advance and retraction, providing addition opportunities for cycle time and quality improvements. For example, without limitation, pecks may occur at around 0.02 inch increments for around five pecks before fully retracting to a starting position.

Thus, the different advantageous embodiments provide a method and apparatus for a power feed drill. The power feed drill comprises a servo motor, a roller screw, a ball spline shaft, an air motor, and a collet chuck. The roller screw is rotatably mounted to the servo motor. The ball spline shaft has a first end connected to the roller screw unit, wherein rotation of the roller screw in a first direction moves the ball spline shaft in a first direction and wherein rotation of the roller screw in a second direction moves the ball spline shaft in an opposite direction to the first direction along an axis. The air motor is capable of transmitting rotation motion to the ball spline shaft to rotate around the axis. The collet chuck is fixably attached to a second end of the ball spline shaft, wherein the collet clamp is adapted to receive a tool.

Figure 3:
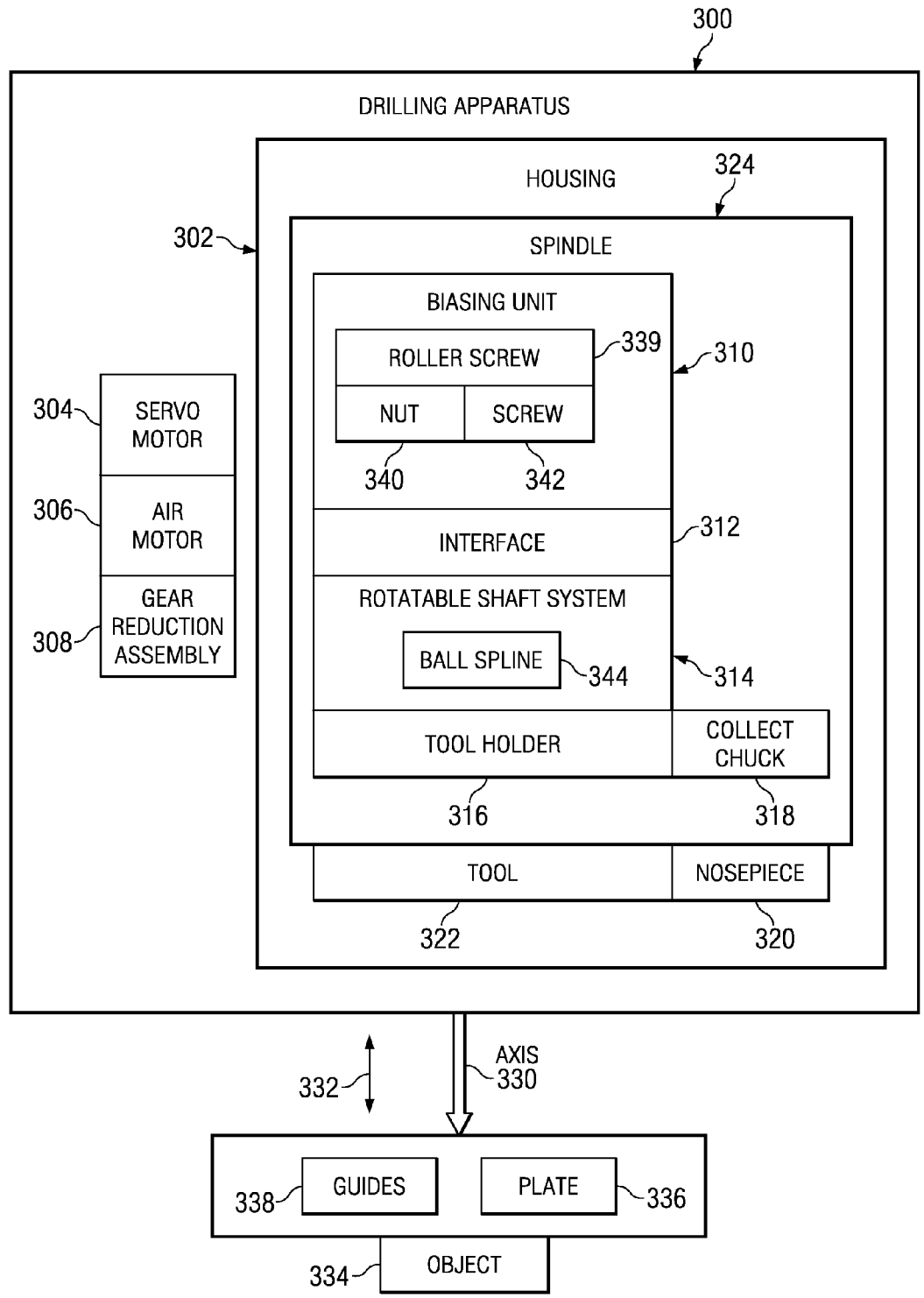
FIG. 3 is a diagram illustrating a drilling apparatus in accordance with an advantageous embodiment.

With reference now to FIG. 3, a diagram illustrating a drilling apparatus is depicted in accordance with an advantageous embodiment. In this example, drilling apparatus 300 is an example of a drilling apparatus that may be used to perform drilling operations during various phases of manufacturing. For example, drilling apparatus 300 may be used during component and subassembly manufacturing 106 as well as during system integration 108 in FIG. 1.

Further, drilling apparatus 300 also may be used during other operations, such as maintenance and service 114 in FIG. 1. In these examples, drilling apparatus 300 is a portable drilling apparatus. Further, drilling apparatus 300 may be easily configurable to perform different drilling operations, such as positive feed drilling, peck and feed drilling, and drilling and countersinking operations. These changes may be made, in these examples, without requiring a change in the components located internally within housing 302.

In this example, drilling apparatus 300 includes housing 302, which holds the various components used to perform drilling operations. Drilling apparatus 300 includes servo motor 304, air motor 306, and gear reduction assembly 308. Drilling apparatus 300 also includes biasing unit 310, interface 312, rotatable shaft system 314, tool holder 316, collet chuck 318, nosepiece 320, and tool 322. In this example, spindle 324 includes biasing unit 310, interface 312, rotatable shaft system 314, tool holder 316, and collet chuck 318.

Biasing unit 310 provides a mechanism to move spindle 324 back and forth with tool 322 in a manner to perform various operations, such as positive feed, peck and feed drilling, and drilling and countersinking. During these operations, spindle 324 may feed in different directions. For example, spindle 324 may move along axis 330 along the directions indicated by arrow 332. This feeding is also referred to as axial movement along axis 330. With a positive feed operation, spindle 324 moves into the object to drill a hole or channel. The feeding of spindle 324 may move tool 322 into and out of object 334. This type of feed of the spindle is referred to as a peck and feed operation. Further, spindle 324 may move to perform drilling and countersinking operations.

Further, plate 336 may be used as a guide to drill holes within object 334. Plate 336 includes guides 338. When plate 336 is used, drilling apparatus 300 also may use nosepiece 320 to secure drilling apparatus 300 to plate 336 for drilling holes within guides 338. Biasing unit 310 moves spindle 324 axially along axis 330 in these examples. Biasing unit 310 may be implemented using any mechanism that moves tool 322 along axis 330. In these examples, biasing unit 310 takes the form of roller screw unit 339.

Roller screw unit 339 includes nut 340 and screw 342. Screw 342 is also referred to as a roller screw and is attached to servo motor 304 in these examples. Servo motor 304 turns screw 342 in a manner that causes nut 340 to move axially in the direction along axis 330. Movement of nut 340 moves interface 312, which in turn also moves rotatable shaft system 314. The movement of all of these components is along axis 330 in these examples.

As a result, tool holder 316 and tool 322 also moves along axis 330 to provide the axial movement for spindle 324. Rotatable shaft system 314 may be implemented using any mechanism that can rotate tool holder 316 about axis 330 and move axially along axis 330. In these examples, rotatable shaft system 314 takes the form of ball spline 344. Of course, other systems may be used. For example, other mechanical splines, gearing mechanisms, keyed shafts, or other suitable devices may be used to transfer the torque or rotation to spindle 324 from air motor 306.

In these examples, air motor 306 is coupled to rotatable shaft system 314 through gear reduction assembly 308. Air motor 306 turns gear reduction assembly 308 in a manner to rotate rotatable shaft system 314. The speed at which rotatable shaft system 314 turns may vary depending on the gearing selected for gear reduction assembly 308.

In these examples, air motor 306 and gear reduction assembly 308 are now moved on the exterior of housing 318 in a manner that allows for quick change outs of these components and other components to change the speed at which rotatable shaft system 314 may be turned.

Further, servo motor 304 is programmable in a manner that allows for different steps to be made as rotations occur within rotatable shaft system 314. A step, in these examples, is the amount that a shaft in servo motor 304 turns to turn screw 342. Servo motor 304, along with biasing unit 310 unit, generates a force for a positive feed motion along axis 330 into object 334.

Air motor 306 provides rotational motion and torque to ball spline 344. Collet chuck 318 provides an ability to hold tool holder 316 and tool 322 in a manner to control the axial movement and the rotation required for drilling object 334. In these examples, collet chuck 318 allows tool 322 to rotate around axis 330 as well as feed back and forth along axis 330. In other words, collet chuck 318 secures tool 322 in place within tool holder 316.

The different components within drilling apparatus 300 are examples of components that may be found in a drilling apparatus. These components are only some of the components that may be found in drilling apparatus. The depiction of these components is not to meant to limit the manner in which drilling apparatus 300 may be implemented. For example, other components may be present in place of or in addition to the ones illustrated in FIG. 3. Examples include a handle, screws to hold components together, electrical wiring, and other suitable components for use in drilling apparatus 300.

Figure 4:
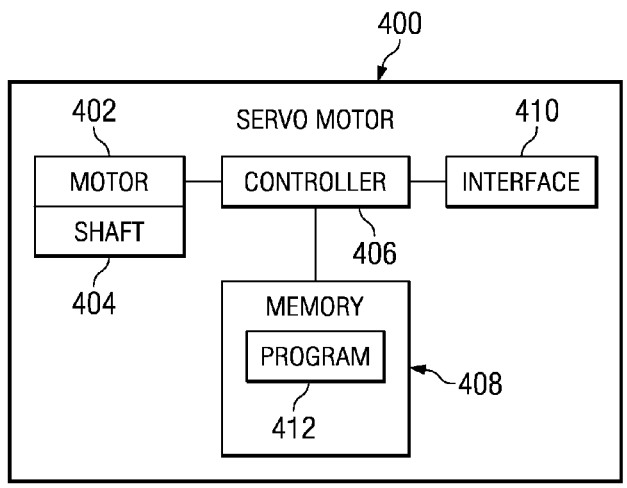
FIG. 4 is a block diagram of a servo motor in accordance with an advantageous embodiment.

Turning now to FIG. 4, a block diagram of a servo motor is depicted in accordance with an advantageous embodiment. In these examples, servo motor 400 is an example of servo motor 304 in FIG. 3.

Servo motor 400 includes motor 402, shaft 404, controller 406, memory 408, and interface 410. Motor 402 may turn shaft 404 to move a biasing unit, such as biasing unit 310 in FIG. 3, in an axial direction. Controller 406 controls the movement of motor 402. This controller may be, for example, an application specific integrated circuit (ASIC), a microprocessor, or some other suitable device.

Controller 406 may receive data or programs for controlling the movement of motor 402. This information may be received through interface 410. Interface 410 is an input/output interface and may be, for example, a serial port or a wireless unit, such as a Bluetooth unit. Program 412 may be stored in memory 408 for execution. Program 412 may include various programs to perform operations, such as force feed drilling, peck and feed drilling, and drilling and countersink processes.

The type of drilling operations that may be formed may be quickly selected by downloading the appropriate data from program 412. In this manner, reconfiguration of the drilling apparatus by changing mechanical parts or using a different drilling apparatus is unnecessary. In fact, various sequences of drilling, drilling pecking, and/or drilling countersinking operations may be combined to perform complex drilling operations on objects. For example, the drill bit may be controlled to retract any given distance or combination of full retract pecks and/or partial pecks, providing additional opportunities for cycle time and quality improvements.

Additionally, the retract and extend speeds may be independently variable. Multiple points for transition from very high speed return to reduced speeds as the drill tip approaches the current bottom of the hole may be implemented to provide optimal cycle time and reduce the impact of drill tip collision with unevacuated chips in the hole. At a programmed distance from the bottom of the hole, the final transition to the drilling feed rate would be preformed. An example of a service motor that may be used for servo motor 400 is a servo having a model identification of iBE231F-NN, which is available from Parker Hannifin Compumotor Division, a division of Parker Hannifin Corporation.

Figure 5:
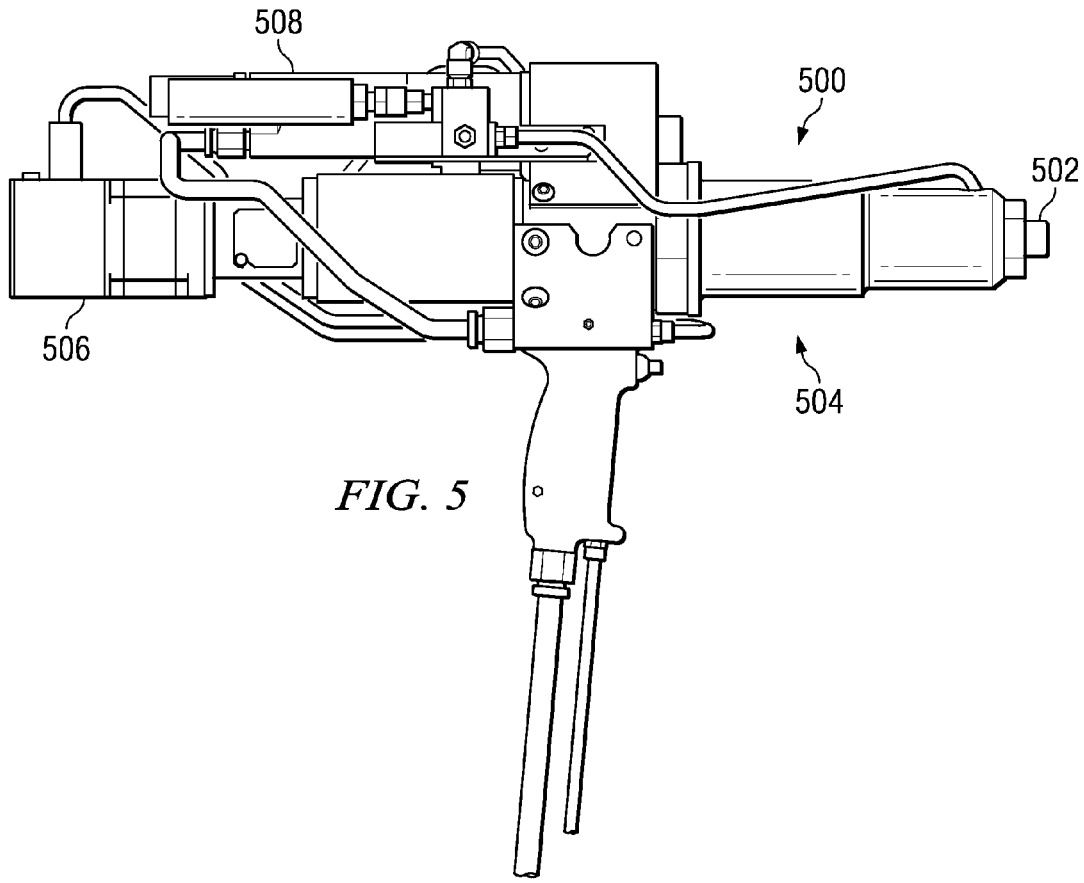
FIG. 5 is a diagram of a drill in accordance with an advantageous embodiment.

With reference now to FIG. 5, a diagram of a drill is depicted in accordance with an advantageous embodiment. In this example, drill 500 is an example of drilling apparatus 300 in FIG. 3. As can be seen in this illustration, drill 500 includes drill spindle 502 within housing 504, which is capable of being configured for various functions, such as positive feed drilling, peck and feed drilling, and/or drilling and countersink processes. Drill 500 also includes servo motor 506 and air motor 508. These two motors are externally mounted to housing 504 in these examples.

Figure 6:
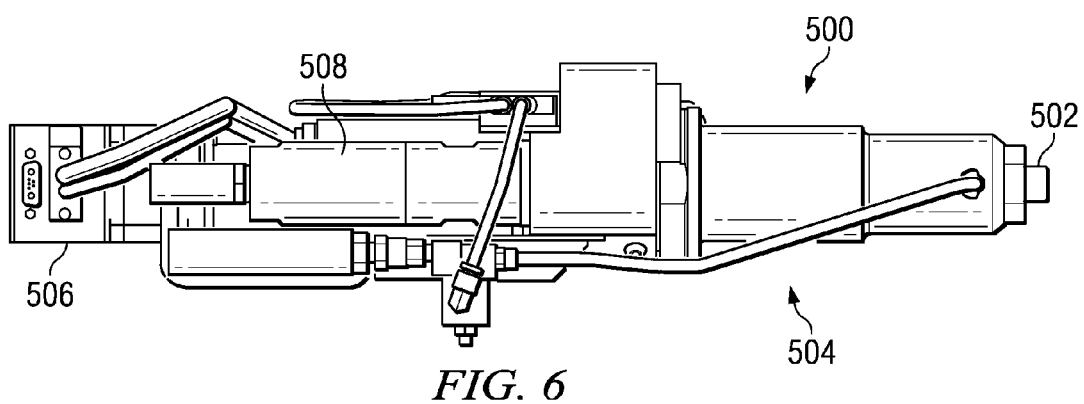
FIG. 6 is a diagram of a top view of a drill in accordance with an advantageous embodiment.

Turning now to FIG. 6, a diagram of a top view of drill 500 is depicted in accordance with an advantageous embodiment.

Figure 7:
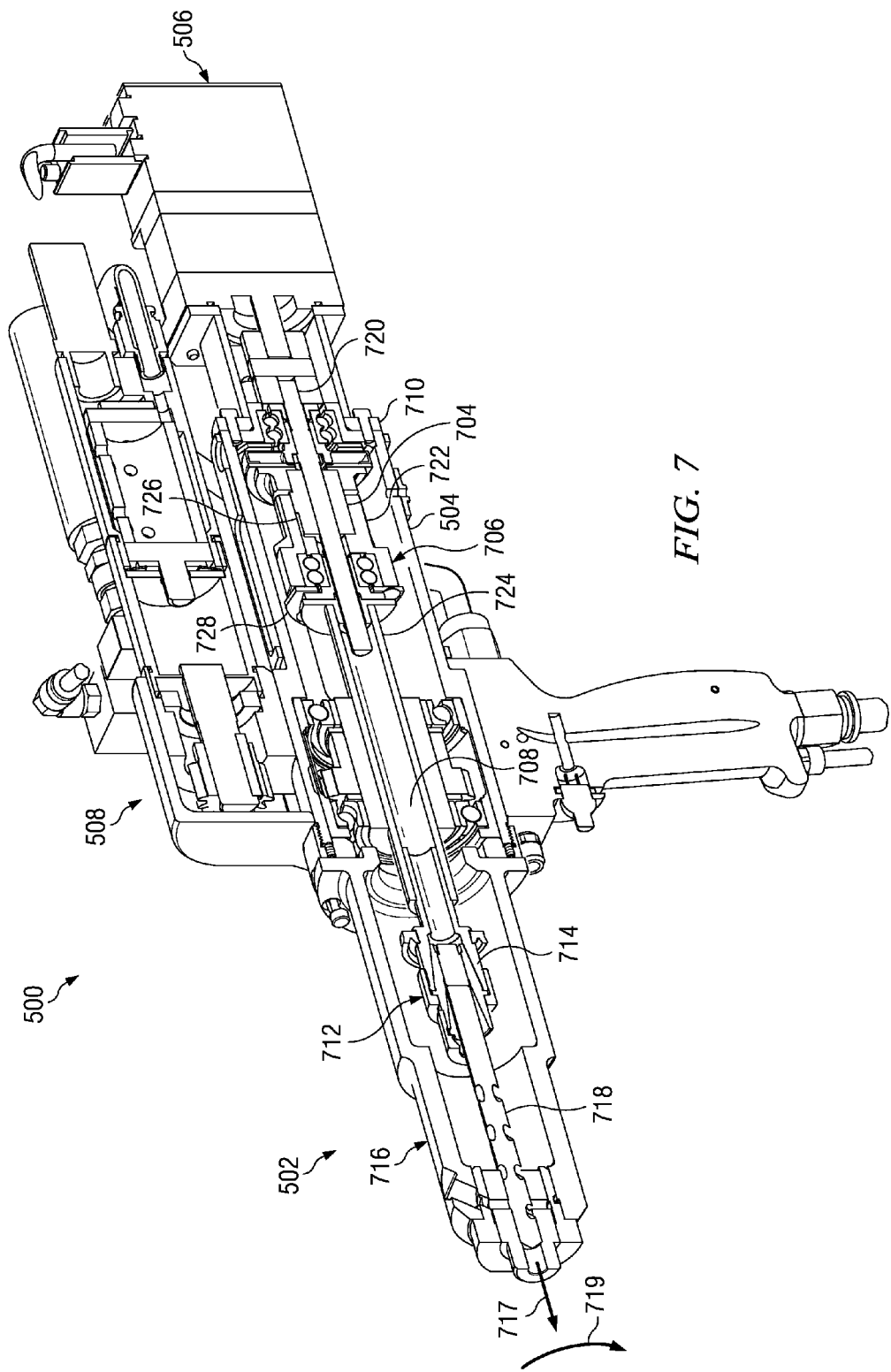
FIG. 7 is an exploded view of a drill with a servo feed control system in accordance with an advantageous embodiment.

With reference to FIG. 7, an exploded view of drill 500 with a servo feed control system is depicted in accordance with an advantageous embodiment. In this example, drill 500 is an example of an apparatus containing a spindle with a servo feed control. In this exploded view, drill 500 includes servo motor 506, roller screw unit 704, ball spline interface 706, ball spline 708, air motor 508, tool holder 712, collet clamp 714, nosepiece 716, and drill bit 718.

In these advantageous embodiments, spindle 502 may include all of the components from servo motor 506 to tool holder 712. In this example, spindle 502 includes servo motor 506, roller screw unit 704, ball spline interface 706, ball spline 708, air motor 508, and tool holder 712.

Of course, spindle 502 may include other components that are involved in rotating and axially moving a drill bit. This spindle design allows for positive feedback drilling in a portable drill motor without the use of air logic valves to control the movement of the spindle back and forth. This back and forth movement is also referred to as axial movement. Axial movement is movement along an axis for line 717 in these examples.

In these examples, spindle 502 may move axially along the direction of line 717 while rotation occurs around line 717 in the direction of arrow 719. The feed movement of spindle 502 is controlled by servo motor 506 in these examples.

In these examples, servo motor 506 turns screw 720 in roller screw unit 704. When screw 720 turns in one direction, nut 722 in roller screw unit 704 may move forward along direction of line 717. When servo motor 506 turns screw 720 in the opposite direction, nut 722 may move in the opposite direction along line 717. The movement of nut 722 moves ball spline interface 706 backwards and forwards along line 717 in the same manner.

Ball spline interface 706 is connected to end 728 of shaft 724 in ball spline 708. In these examples, ball spline 708 provides a mechanism to receive torque from air motor 508 to turn spindle 502. Shaft 724 is rotatably connected to ball spline interface 706. In other words, shaft 724 may rotate while ball spline interface 706 moves axially along line 717. In this example, end 728 of shaft 724 is connected to tool holder 712.

The axial movement of shaft 724 causes tool holder 712 to move along the direction of line 717. In turn, drill bit 718 also moves in the same direction along line 717. In this manner, servo motor 506 generates feed motion for spindle 502.

In these examples, the rotational turning of spindle 502 is driven by air motor 508. Air motor 508 transfers rotational torque or movement to shaft 724 in ball spline 708. Air motor 508 is not part of spindle 502 and is not axially moved for any of the feed operations. In these illustrative examples, air motor 508 is mounted to the exterior of housing 504 to allow for easier changes or reconfigurations of drill 500 with different air motors as compared to currently available drills in which the air motor is located inside of housing 504 and/or are inline with spindle 502. As can be seen, another feature, in these examples, is shaft 724 as a hollow rotatable shaft in which screw 720 may extend into shaft 724. This feature allows for shortening the length of spindle 502.

Collet clamp 714 functions to hold drill bit 718 in place within tool holder 712. Collet clamp 714 is an example of collet chuck 318 in FIG. 3 and allows for the turning of drill bit 718 around line 717 as well as axial movement along line 717. Nosepiece 716 allows drill 500 to be secured to a plate having guides to drill holes. Nosepiece 716 is an example of nosepiece 320 in FIG. 3.

In this example, drill 500 may deliver 400 pounds of constant thrust along line 717. Further, axial speeds may include 2.5 inches per second depending on the type of servo motor used. Further, a movement of one millimeter per revolution also may be achieved through selected types of servo motors, roller screws, and/or other suitable components. The rotational movement of spindle 502 may be changed through different air motors. Air motor 508 is mounted on the outside of housing 504 to allow for easier changes to what air motor is used. This type of configuration is in contrast to the currently used air motors in which the air motors are in line with or part of spindle 502.

Figure 8:
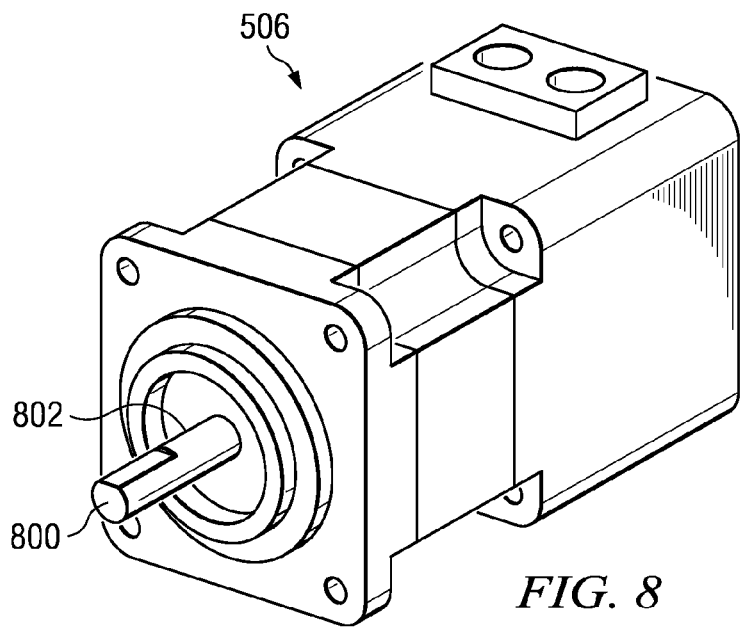
FIG. 8 is a diagram of a perspective view of a servo motor in accordance with an advantageous embodiment.

With reference now to FIG. 8, a diagram of a perspective view of servo motor 506 is depicted in accordance with an advantageous embodiment. In this example, servo motor 506 contains an integrated controller, amplifier and encoder. Further, servo motor 506 is programmable in a manner that different speeds of axial movement of spindle 502 may be controlled using servo motor 506. End 800 of shaft 802 is connected to screw 720 of roller screw unit 704.

Figure 9:
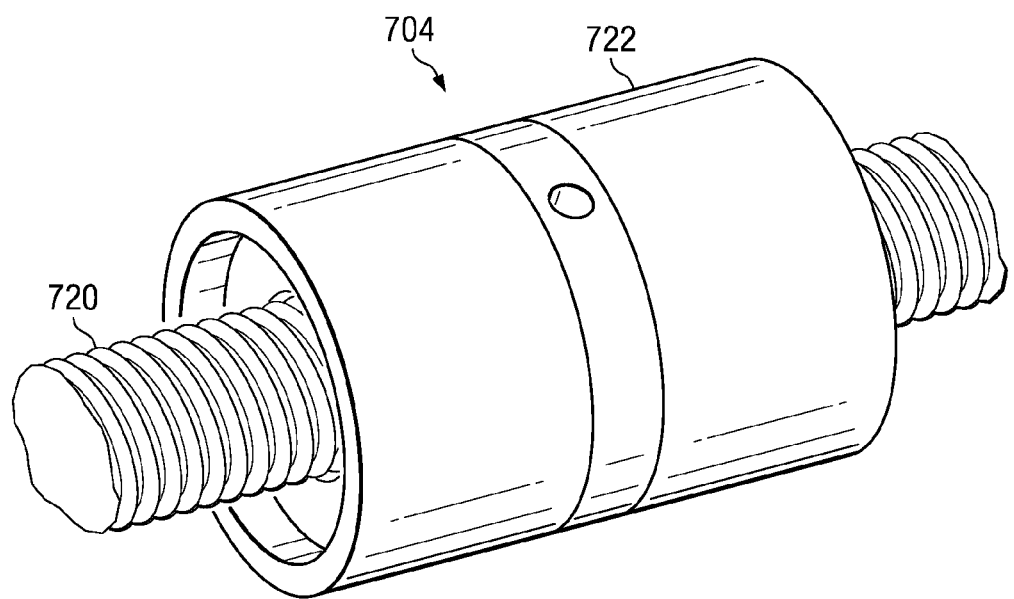
FIG. 9 is a diagram of a perspective view of a roller screw unit in accordance with an advantageous embodiment.

Turning now to FIG. 9, a diagram of a perspective view of roller screw unit 704 is depicted in accordance with an advantageous embodiment. In this example, roller screw unit 704 provides for precision in the feeding or axial movement of spindle 502. As screw 720 is turned by servo motor 506, nut 722 may move forward or backwards in the axial motion relative to the turning of spindle 502. An example of a device that may be used to implement roller screw unit 704 is a Satellite Roller Screw, model 606473/1, which is available from Rolvis® Swiss.

Figure 10:
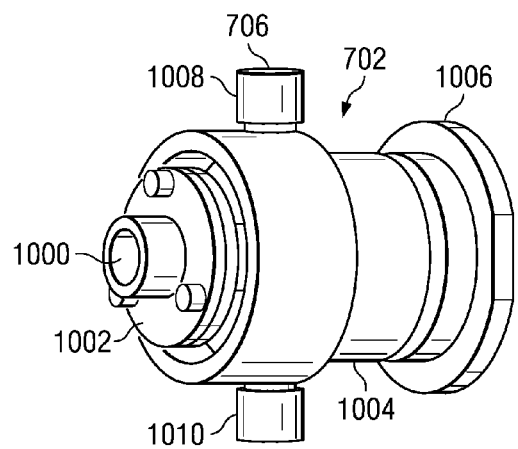
FIG. 10 is a diagram of a perspective view for a ball spline interface in accordance with an advantageous embodiment.

With reference now to FIG. 10, a diagram of a perspective view for ball spline interface 706 is depicted in accordance with an advantageous embodiment. In this example, ball spline interface 706 includes rotatable member 1000. End 728 of shaft 724 may be attached on rotatable member 1000 in housing 1002. Rotatable member 1000 is rotatable independent of housing 1002 for ball spline interface 706. Nut 722 and screw 720 may be located within channel 726 on end 1006 of ball spline interface 706.

Ball spline interface 706 transmits the axial thrust generated by roller screw unit 704 to ball spline 708. Rotatable member 1000 includes isolation to isolate rotation from ball spline interface 706 from roller screw unit 704. Further, torque reactions rollers 1008 and 1010 prevent housing 1002 from rotating. These rollers react to the torque of the roller screw nut and not the drill thrust in these examples. Channel 726 on end 1006 allows screw 720 in roller screw unit 704 to travel inside ball spline 708 in a manner that reduces the overall length.

Figure 11:
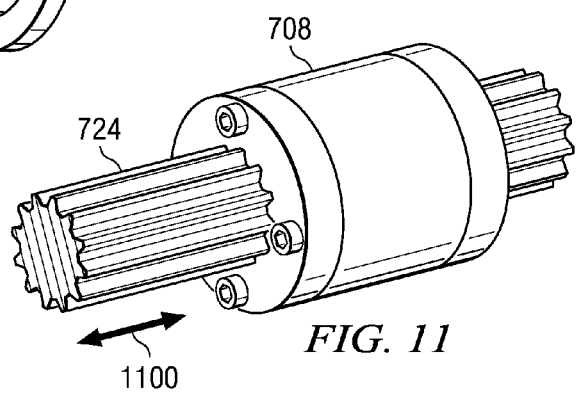
FIG. 11 is a diagram of a perspective view of a ball spline in accordance with an advantageous embodiment.

Turning now to FIG. 11, a diagram of a perspective view of ball spline 708 is depicted in accordance with an advantageous embodiment. In this example, ball spline 708 provides a mechanism to transmit torque to allow rotation by allowing axial travel along the directions of arrow 1100. Ball spline 708 delivers torque from air motor 508. As described above, shaft 724 is hollow to contain screw 720 in roller screw unit 704.

Ball spline 708 is a linear motion system, in which balls accommodated or found in the spline nut transmit torque while linearly moving on precision-ground raceways on a spline shaft, such as shaft 724. An example of a device that may be used to implemented ball spline 708 is a ball spine model number LT20UUCM+143LN, which is available from THk Co.

Figure 12:
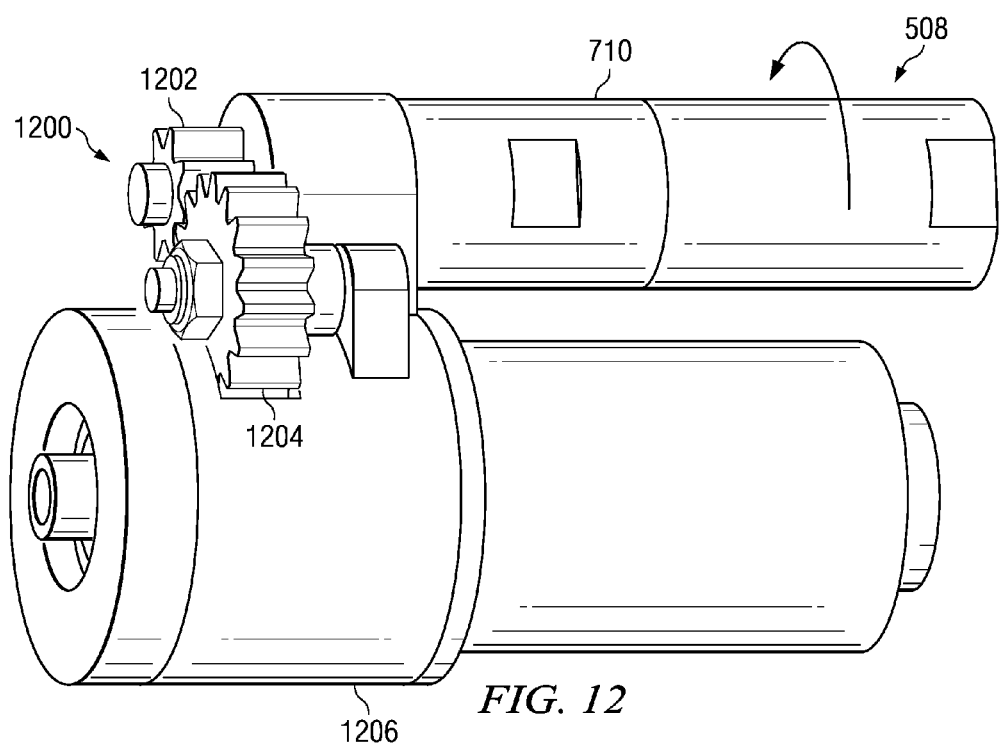
FIG. 12 is an illustration of a perspective view for an air motor in accordance with an advantageous embodiment.

With reference now to FIG. 12, an illustration of a perspective view for air motor 508 is depicted in accordance with an advantageous embodiment. In this example, air motor 508 is connected to ball spline 708 through gear reduction assembly 1200, which includes gears 1202 and 1204 in these examples. Housing 1206 houses the bearings on the outside of the ball spline nut and the drive gear pressed on the outside diameter of the ball spline nut.

In these examples, air motor 508 may be, for example, a pneumatic motor having around 1.1 horsepower that generates around 570 revolutions per minute to around 21000 revolutions per minute. In this example, a 2:1 gear reduction to the ball spline is generated.

Changing the revolutions per minute using air motor 508 may be performed by replacing air motor 508 with a different air motor or with a different gear reduction system such as, gear 1202. Air motor 508 includes an air valve that is under control of a program, such as a software component. An example of a device that may be used to implement air motor 508 is an air motor, model LZB42, which is available from Atlas Copco, AB.

Figure 13:
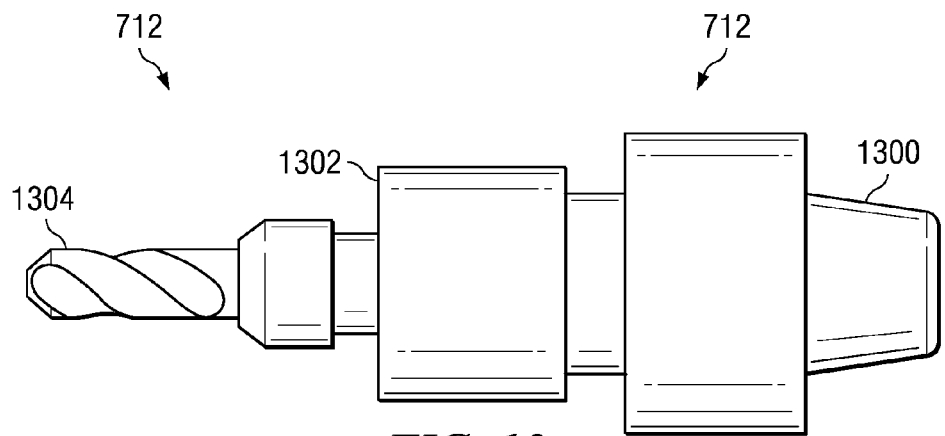
FIG. 13 is a perspective view of a tool holder in accordance with an advantageous embodiment.

With reference now to FIG. 13, a perspective view of a tool holder is depicted in accordance with an advantageous embodiment. In this example, tool holder 712 has end 1300, which connects to shaft 724 of ball spline 708. End 1302 receives a tool, such as drill bit 1304. This component holds the tool in place while drill 500 performs drilling operations.

Figure 14:
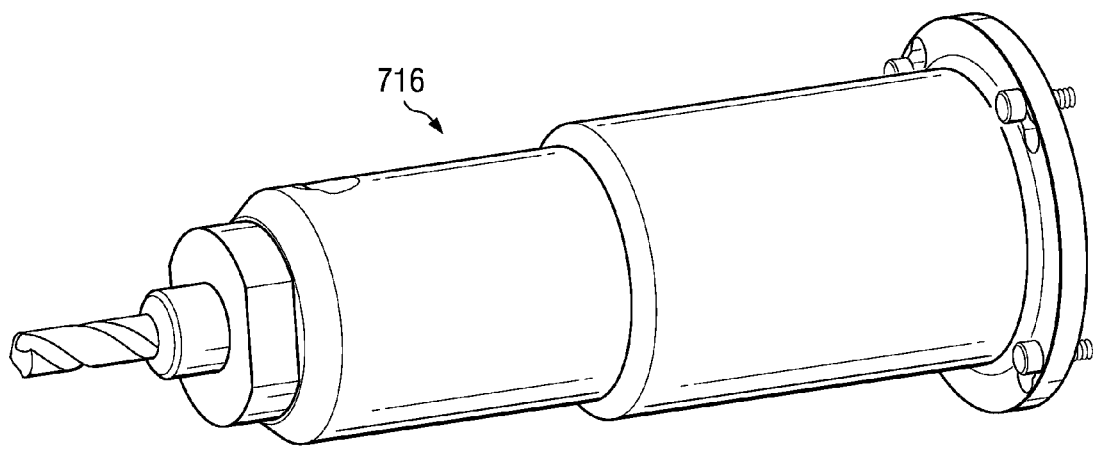
FIG. 14 is a diagram of a perspective view for a nosepiece in accordance with an advantageous embodiment.

Turning now to FIG. 14, a diagram of a perspective view for nosepiece 716 is depicted in accordance with an advantageous embodiment. In this example, nosepiece 716 may be used with a number of different types of drill plates.

Figure 15:
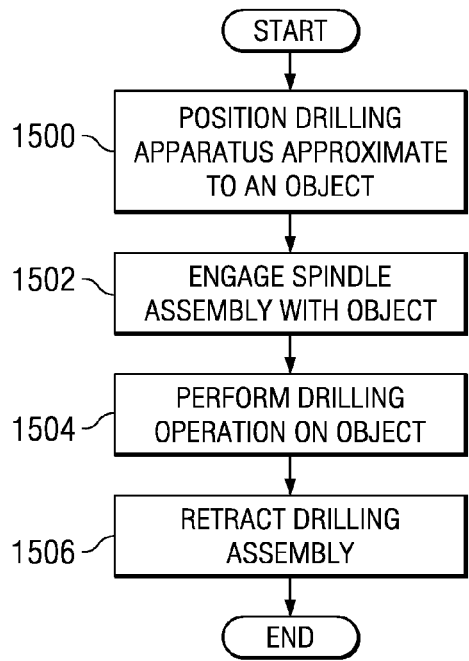
FIG. 15 is a flowchart of a process for performing a drilling operation in accordance with an advantageous embodiment.

With reference now to FIG. 15, a flowchart of a process for performing a drilling operation is depicted in accordance with an advantageous embodiment. The process illustrated in FIG. 15 may be implemented using a drilling apparatus, such as drilling apparatus 300 in FIG. 3.

The process begins by positioning the drilling apparatus approximate to an object (operation 1500). The spindle assembly is engaged with the object (operation 1502). Depending on the implementation, operation 1502 also may include engaging a nosepiece to a plate. The drilling operation is performed on the object (operation 1504). This drilling operation may be, for example, a positive feed operation, a peck and feed operation, drilling and countersinking operation, and/or any other suitable operation for the device. When the drilling operation is complete, the drilling assembly is retraced (operation 1506), with the process terminating thereafter.

Figure 16:
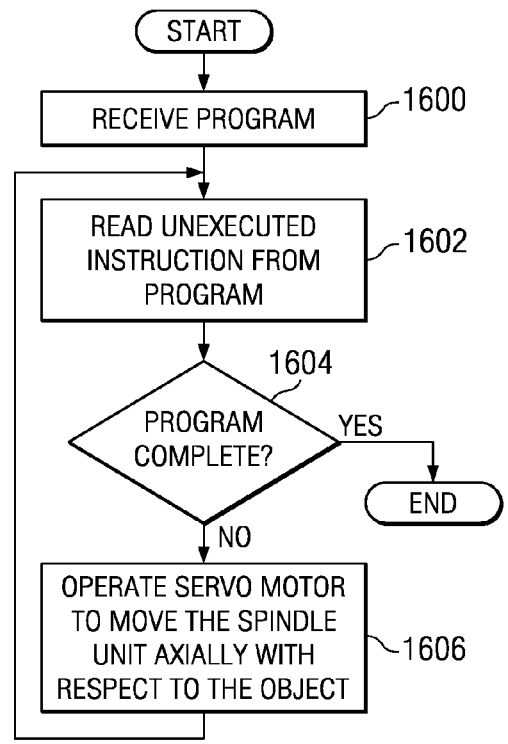
FIG. 16 is a flowchart of a process for performing feed operations in accordance with an advantageous embodiment.

With reference now to FIG. 16, a flowchart of a process for performing feed operations is depicted in accordance with an advantageous embodiment. The process illustrated in FIG. 16 may be performed to feed or move a spindle back and forth axially during a drilling operation. The process illustrated in FIG. 16 may be implemented in a servo motor, such as servo motor 400 in FIG. 4.

The process begins by receiving a program (operation 1600). This program contains instructions identifying how the servo motor should be turned to control feed or axial movement of the spindle. The process then reads an unexecuted instruction from the program (operation 1602). The process determines whether the program is completed (operation 1604).

If the program is not completed, the process operates a servo motor to move the spindle unit axially with respect to the object based on the instruction (operation 1606). The process returns to operation 1602 to read another instruction from the program. These instructions may be to turn the servo motor in one direction or an opposite direction. In some cases, an instruction may be to not perform any turning of the servo motor.

With reference again to operation 1604, when the program is complete, the process terminates. In this manner, complex peck and feed operations may be performed. For example, the different advantageous embodiments may control the spindle to retract any given distance or combination of full retract pecks and partial pecks. These options provide additional opportunities for cycle time and quality improvements.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A power feed drill comprising:
a servo motor;
a roller screw rotatably mounted to the servo motor;
a ball spline shaft having a first end connected to the roller screw, wherein the ball spline shaft has a channel and the roller screw extends into a portion of the channel, wherein rotation of the roller screw in a first direction moves the ball spline shaft in the first direction and wherein rotation of the roller screw in a second direction moves the ball spline shaft in an opposite direction to the first direction along an axis;
an air motor capable of transmitting rotation motion to the ball spline shaft to rotate around the axis; and
a collet chuck fixably attached to a second end of the ball spline shaft, wherein the collet chuck is adapted to receive a tool.

2. The power feed drill of claim 1 further comprising:
a gear reduction assembly, wherein the air motor transmits rotational motion through the gear reduction assembly.

3. The power feed drill of claim 1, wherein the tool is a drill bit.

4. The power feed drill of claim 1, wherein the servo motor is capable of moving the ball spline shaft to perform a peck feed operation in which the ball spline shaft may move back and forth along the axis in different distances while a drilling is performed on an object.

5. The power feed drill of claim 1 further comprising:
a ball spline interface that connects the first end to a nut coupled to the roller screw.

6. The power feed drill of claim 5, wherein the first end is rotatably connected to the ball spline interface wherein rotation of the first end occurs without rotating the roller screw.

7. The power feed drill of claim 1, wherein the servo motor comprises:
a motor; and
a controller, wherein the controller is capable of controlling operation of the motor to cause feed operations.

8. The power feed drill of claim 7, wherein the feed operations comprise power feed forward drilling, peck and feed drilling, and drilling and counter sink operations.

9. An apparatus comprising:
a roller screw unit capable of being moved by a first motor;
a rotatable shaft system having a ball spline shaft that is capable of being rotated about an axis and the ball spline shaft having a first end connected to the biasing unit, the ball spline shaft having a channel and the roller screw unit extending into a portion of the channel, wherein the roller screw unit is capable of moving the rotatable shaft system a first direction and a second direction along the axis while the shaft rotates about the axis; and
a collet chuck fixably attached to a second end of the shaft, wherein the collet chuck is adapted to receive a tool.

10. The apparatus of claim 9, wherein the first motor is a servo motor.

11. The apparatus of claim 9, wherein the shaft is rotated by an air motor.

12. The apparatus of claim 10, wherein the biasing unit is a roller screw unit having a screw rotatably mounted to the servo motor.

13. The apparatus of claim 9 further comprising:
a ball spline interface that connects the first end to the second end of the roller screw unit.

14. The apparatus of claim 13, wherein the first end is rotatably connected to the ball spline interface wherein rotation of the first end occurs without rotating the roller screw unit.

15. The apparatus of claim 9 further comprising;
a housing, wherein the air motor is mounted to an external portion of the housing.

16. A method for performing a drilling operation;
positioning a spindle assembly to perform the drilling operation on an object, wherein the spindle assembly comprises a roller screw rotatably mounted to a servo motor; a ball spline shaft having a first end connected to the roller screw, the ball spline shaft having a channel and the roller screw unit extending into a portion of the channel, wherein rotation of the roller screw in a first direction moves the ball spline shaft in the first direction and wherein rotation of the roller screw in a second direction moves the ball spline shaft in an opposite direction to the first direction along an axis, wherein the ball spline shaft is rotatable around the axis while moving in the first direction and in the second direction; and a collet chuck fixably attached to a second end of the ball spline shaft, wherein the collet chuck is adapted to receive a tool; and
performing the drilling operation using the spindle assembly.

17. The method of claim 16, wherein the ball spline shaft is rotated around the axis by an air motor and wherein the roller screw is rotated in the first direction and the second direction by the servo motor.

* * * * *